(12) United States Patent
Hong et al.

(10) Patent No.: US 11,355,787 B2
(45) Date of Patent: Jun. 7, 2022

(54) METHOD FOR REGENERATING EOL CELL

(71) Applicant: LG CHEM, LTD., Seoul (KR)

(72) Inventors: Chul Gi Hong, Daejeon (KR); Dae Soo Kim, Daejeon (KR); Dong Kyu Kim, Daejeon (KR); Jae Hyun Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 239 days.

(21) Appl. No.: 16/618,464

(22) PCT Filed: Dec. 20, 2018

(86) PCT No.: PCT/KR2018/016298
§ 371 (c)(1),
(2) Date: Dec. 2, 2019

(87) PCT Pub. No.: WO2019/132403
PCT Pub. Date: Jul. 4, 2019

(65) Prior Publication Data
US 2020/0119407 A1      Apr. 16, 2020

(30) Foreign Application Priority Data

Dec. 28, 2017 (KR) .................. 10-2017-0182084

(51) Int. Cl.
*H01M 10/42* (2006.01)
*H01M 10/0585* (2010.01)
(Continued)

(52) U.S. Cl.
CPC ....... *H01M 10/42* (2013.01); *H01M 10/0525* (2013.01); *H01M 10/0585* (2013.01); *H01M 10/39* (2013.01)

(58) Field of Classification Search
CPC .. H01M 10/42; H01M 10/0585; H01M 10/39; H01M 50/543; H01M 2220/30;
(Continued)

(56) References Cited

U.S. PATENT DOCUMENTS

| 5,100,745 A | 3/1992 | Earl |
| 5,882,811 A | 3/1999 | Kawakami |

(Continued)

FOREIGN PATENT DOCUMENTS

| JP | 2010-21104 A | 1/2010 |
| JP | 2011-159545 A | 8/2011 |

(Continued)

OTHER PUBLICATIONS

Extended European Search Report dated Jul. 2, 2020, for European Application No. 18893852.6.

(Continued)

*Primary Examiner* — Kaity V Chandler
(74) *Attorney, Agent, or Firm* — Birch, Stewart, Kolasch & Birch, LLP

(57) ABSTRACT

A method for regenerating an end of life (EOL) cell which comprises an electrode assembly including a cathode, an anode, and a separator interposed between the cathode and the anode, wherein the EOL cell is left under a high temperature environment of 80° C. or higher for a predetermined time while pressure is applied thereto, whereby gas located within the electrode assembly is moved to the outer portion of the electrode assembly is provided. The method can regenerate an EOL cell in a simple and economical way without breaking or damaging the same, and furthermore can also be applied to a pack or module which is an extended unit of the cell. A pressuring jig is also provided.

10 Claims, 6 Drawing Sheets

(51) Int. Cl.
  *H01M 10/39* (2006.01)
  *H01M 10/0525* (2010.01)

(58) Field of Classification Search
  CPC ......... H01M 2220/20; H01M 10/0468; H01M 10/615; H01M 10/54; H01M 10/52; H01M 10/052; H01M 2220/10; H01M 10/0525; H01M 10/486; H01M 10/4242; Y02P 70/50; Y02E 60/10; Y02W 30/84
  See application file for complete search history.

(56) References Cited

U.S. PATENT DOCUMENTS

| | | | |
|---|---|---|---|
| 2001/0008723 | A1 | 7/2001 | Kawakami et al. |
| 2010/0124691 | A1 | 5/2010 | Harris |
| 2014/0068929 | A1 | 3/2014 | Mizusawa |
| 2016/0043450 | A1 | 2/2016 | Sloop |
| 2016/0233481 | A1* | 8/2016 | Chang ................. H01M 10/486 |

FOREIGN PATENT DOCUMENTS

| | | | |
|---|---|---|---|
| JP | 2017-188282 A | | 10/2017 |
| JP | 2017188282 A | * | 10/2017 |
| KR | 10-0832245 B1 | | 5/2008 |
| KR | 100832245 B1 | * | 5/2008 |
| KR | 10-2015-0022264 A | | 3/2015 |
| KR | 10-2015-0037049 A | | 4/2015 |
| KR | 20150107115 A | * | 9/2015 |
| KR | 10-1663026 B1 | | 10/2016 |
| KR | 10-1713068 B1 | | 3/2017 |
| KR | 10-1731213 B1 | | 4/2017 |
| KR | 10-2017-0087250 A | | 7/2017 |
| KR | 10-2017-0101582 A | | 9/2017 |
| WO | WO 2012/035631 A1 | | 3/2012 |

OTHER PUBLICATIONS

International Search Report (PCT/ISA/210) issued in PCT/KR2018/016296, dated Apr. 4, 2019.
Korean Notice of Final Rejection for Korean Application No. 10-2017-0182084, dated Jun. 28, 2021, with an English translation.

* cited by examiner

[Fig. 1]
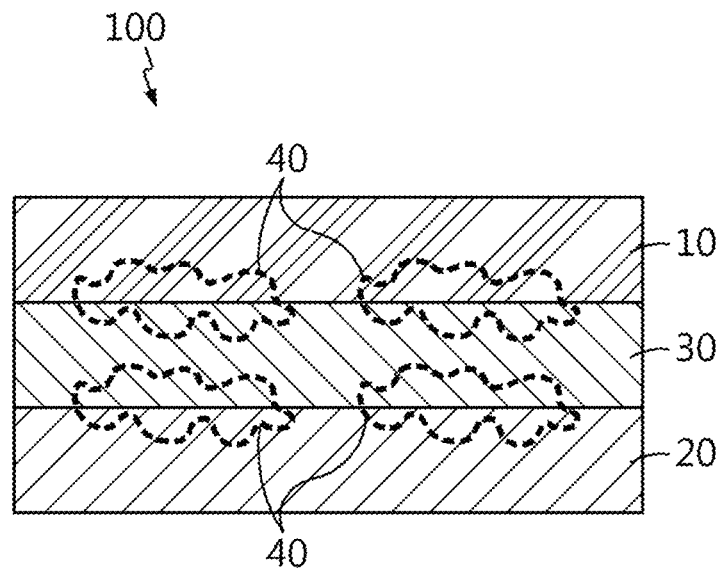
[Fig. 2]
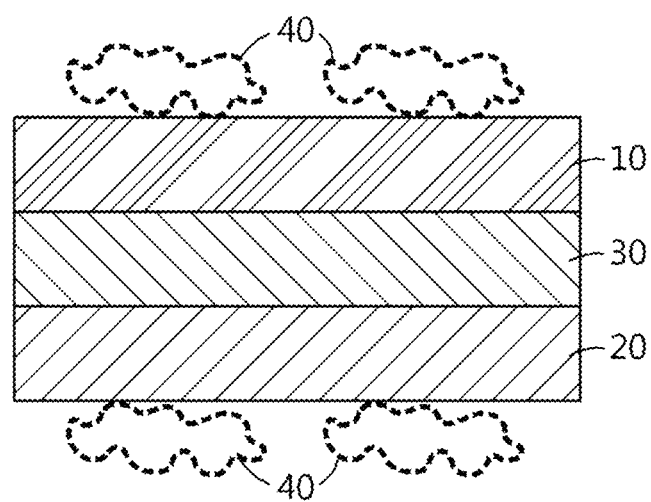

[Fig. 3]
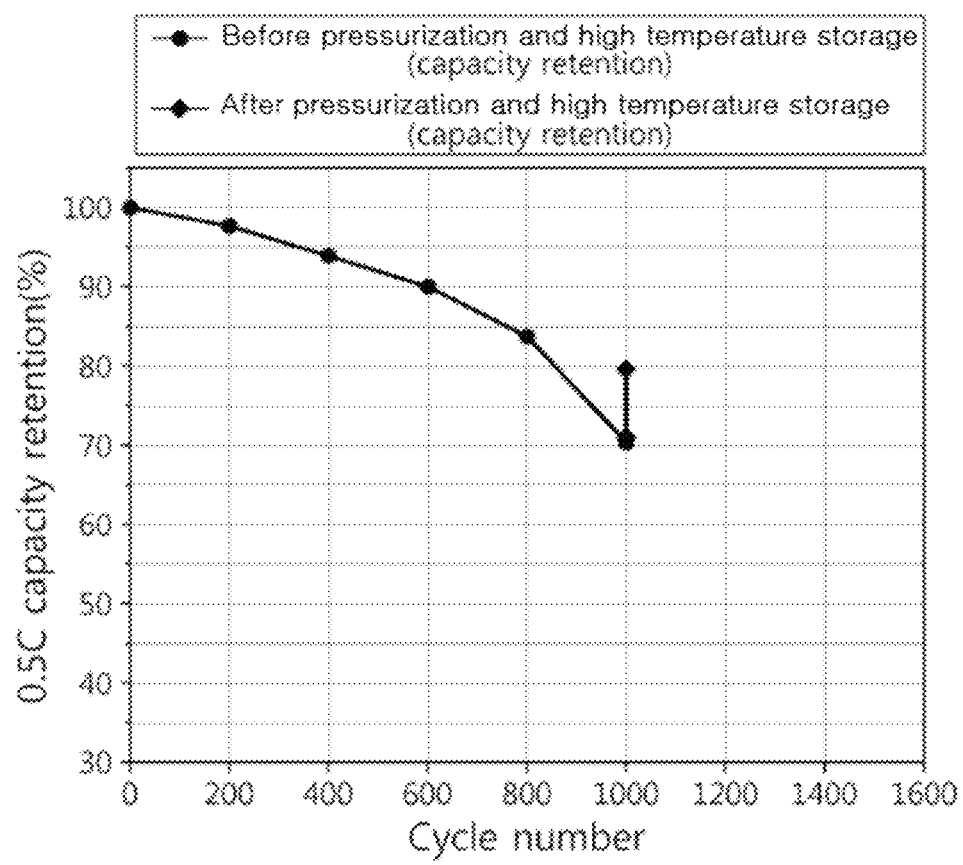

[Fig. 4]
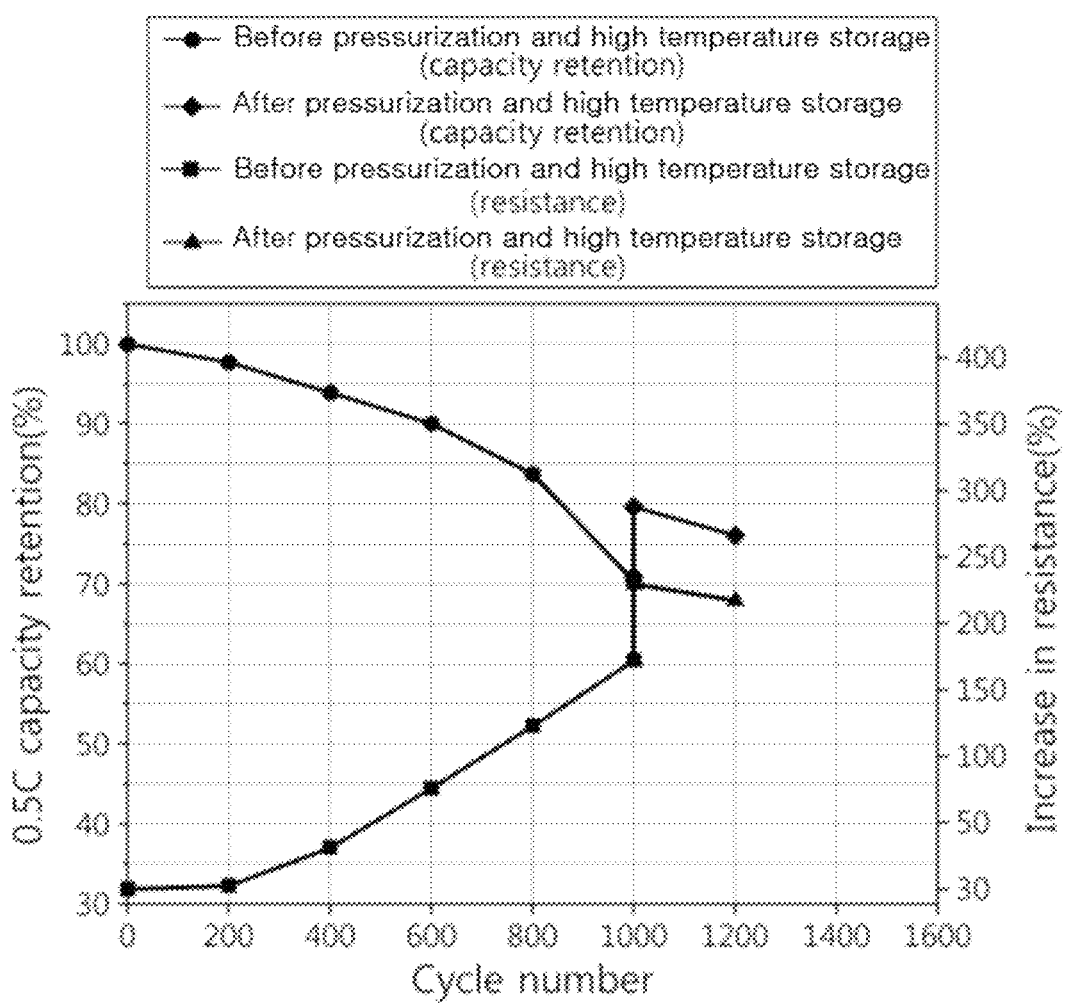

[Fig. 5]
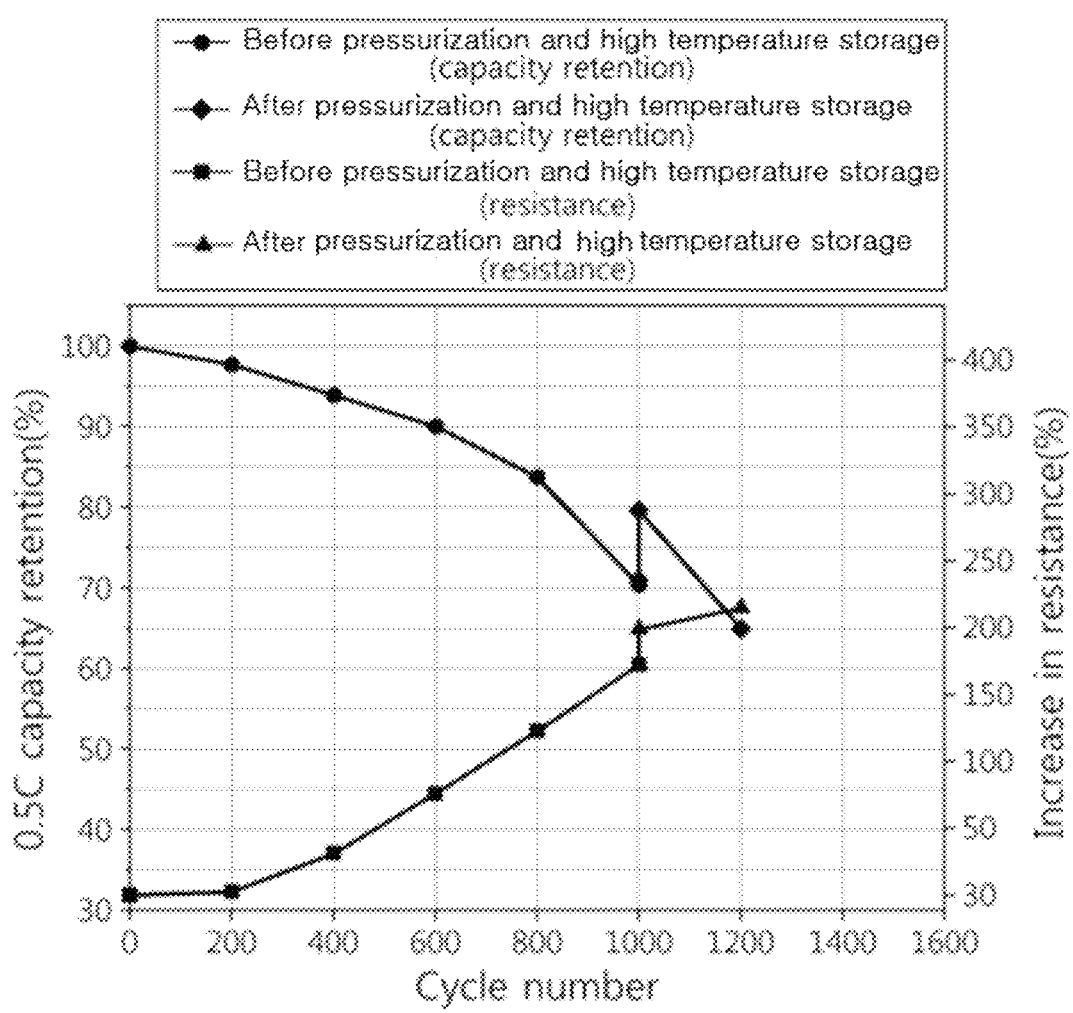

[Fig. 6]
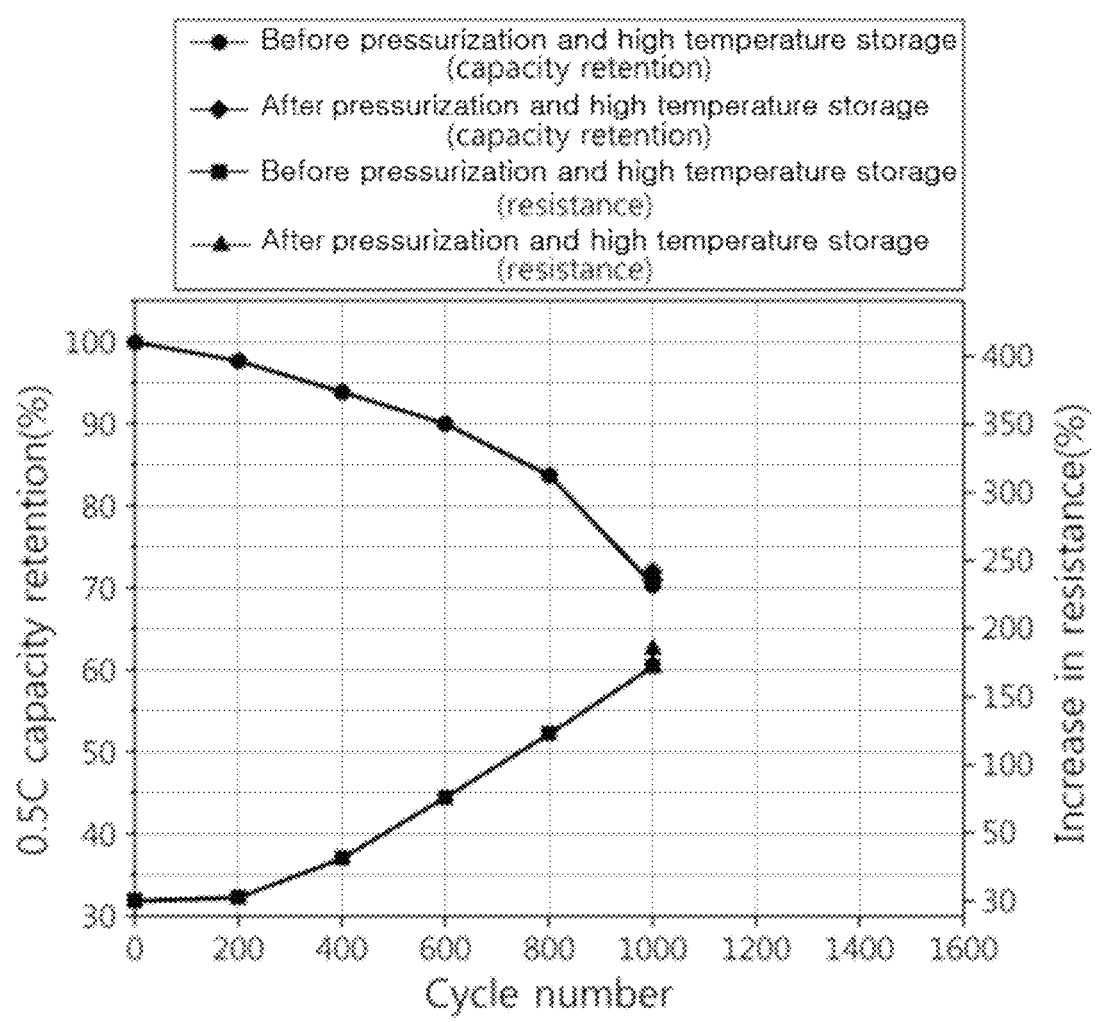

[Fig. 7]
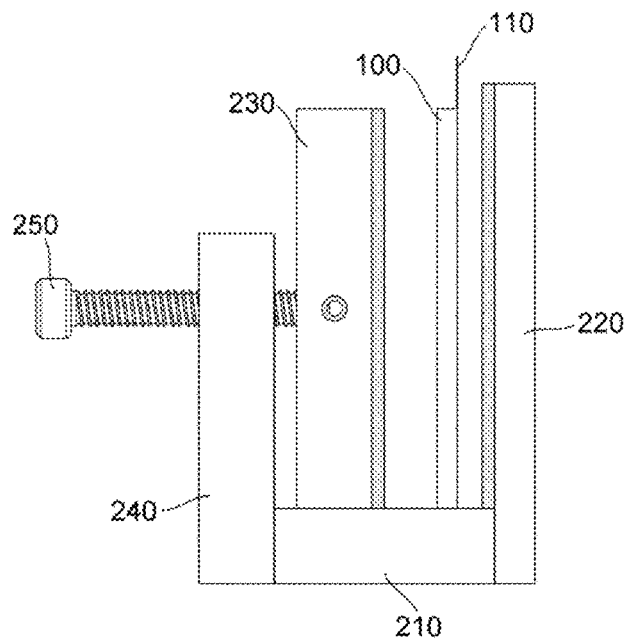
[Fig. 8]
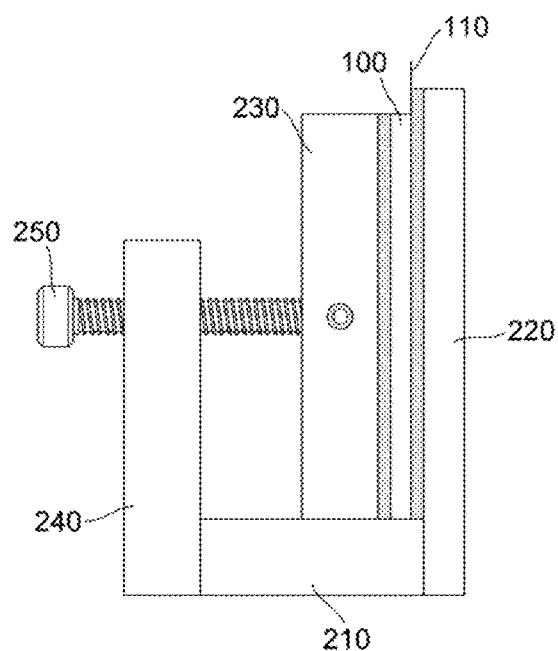

METHOD FOR REGENERATING EOL CELL

TECHNICAL FIELD

This application claims the benefit of priority based on Korean Patent Application No. 10-2017-0182084, filed on Dec. 28, 2017, and the entire contents of the Korean patent application are incorporated herein by reference.

The present invention relates to a method for regenerating an end of life (EOL) cell, and more particularly, to a method for regenerating an EOL cell without destroying or damaging the EOL cell.

BACKGROUND ART

Electrical/electronic devices such as portable computers, portable communication terminals, etc., are becoming smaller for portable purposes together with the development of technologies, and secondary batteries capable of being repeatedly charged are widely used to supply power to such electrical/electronic devices. Various types of secondary batteries are currently being researched and developed, but the most widely commercialized products are lithium secondary batteries.

Lithium secondary batteries are not capable of infinite charge/discharge, but are a consumable product that has a life-span that cannot achieve the intended purpose when exceeding a limited number of charge/discharge cycles of a predetermined number of times which may be hundreds to thousands of times. As such, in proportion to the amount of use and the expansion of the range of use, the amount of waste of lithium secondary batteries is increasing.

On the other hand, when the capacity retention rate becomes less than 80% and reaches the end of life (EOL), rapid capacity deterioration occurs. The biggest factor of the deterioration may be understood as the increase in internal resistance due to gas generation by side reactions. The deteriorated cells are disposed of, or the cells are disassembled to recycle their contents. Both of these methods are economically expensive. In order to solve this problem, research on reuse of degenerated cells has been actively conducted.

This reuse method involves injecting a certain amount of electrolyte and replenishing the lithium source to become suitable for reuse. However, most existing methods require the use of expensive equipment in a well-controlled environment for injection, and the injection can be performed by making a hole in the cell body or cutting the terrace of the cell. As such, it is difficult to actually apply the reuse method.

DISCLOSURE

Technical Problem

Accordingly, an object of the present invention is to provide a method for regenerating an EOL cell, which is a simple and economical method, without destroying or damaging the EOL cell.

Technical Solution

In an aspect, there is provided a cell regeneration method for moving a gas located inside an electrode assembly, which includes a positive electrode 10, a negative electrode 20, and a separator interposed between the positive electrode 10 and the negative electrode 20, to an external portion of the electrode assembly by leaving an end of life (EOL) cell under high temperature environment of 80° C. or more for a predetermined time while applying pressure to the EOL cell including the electrode assembly 100.

In this case, the end of life (EOL) cell may be a cell having a capacity retention rate of less than 80%.

The high temperature environment may be 80 to 100° C.

The pressure applied to the EOL cell may be 2,133 psi to 3,555 psi.

The time for leaving the EOL cell as it is may be 20 minutes to 24 hours.

The EOL cell may be a pouch-type cell.

The cell regeneration method of the present invention may be to apply pressure to the EOL cell by a pressurizing jig.

In another aspect, there is provided a pressurizing jig for regenerating an end of life (EOL) cell, including: a lower frame configured to support the EOL cell; a support located on one side of the lower frame and having a flat upper surface having a larger area than the EOL cell; a side frame located on one side of the lower frame and having a hole through which a pressurizing bar penetrates; a pressurizing plate which is connected to a pressurizing bar and is installed to move between the support and the side frame, and pressurizes a front surface of the EOL cell; and a pressurizing bar, which penetrates through the side frame, one end of which is located at an external side of the side frame, the other end of which is connected to the pressurizing plate, and which moves the pressurizing plate in a direction of the EOL cell to thereby pressurize the EOL cell, in which the EOL cell is mounted between the pressurizing plate and the support and is pressurized.

At this time, the EOL cell may be mounted on the pressurizing jig 200 such that the electrode tab of the EOL cell faces upward, one side of the front surface of the EOL cell is in contact with the support, and the other side of the front surface of the EOL cell is in contact with the pressurizing plate.

In an embodiment of the present invention, the EOL cell may be accommodated inside a chamber and sealed to create the high temperature environment, and the chamber may include: a temperature sensing member configured to sense a temperature inside the chamber; and a display unit for displaying the temperature sensed by the temperature sensing.

Further, the EOL cell may be applied to any one selected from the group consisting of a mobile phone, a portable computer, a wearable electronic device, an electric vehicle, a hybrid electric vehicle, a plug-in hybrid electric vehicle, and a power storage device.

Advantageous Effects

According to the present invention, cells can be regenerated in a simple and economical manner without destroying or damaging the EOL cells.

Furthermore, it can be applied to a pack or module unit extended more than a cell.

BRIEF DESCRIPTION OF THE DRAWINGS

The following drawings, which are attached to this specification, illustrate preferred embodiments of the present invention, and together with the contents of the present invention, help a better understanding on the technical spirit of the present invention. Hence, the present invention should not be interpreted to be limited to the matters described in such drawings.

FIG. 1 is a view schematically showing that gas is formed in an electrode assembly inside an end of life (EOL) cell.

FIG. 2 is a view schematically showing a state in which a gas has moved to the outside of the electrode assembly after going through the cell regeneration method according to an embodiment of the present invention.

FIG. 3 is a graph showing an increase in the capacity retention rate of a cell after going through the cell regeneration method according to an embodiment of the present invention.

FIG. 4 is a graph showing a capacity retention rate after further 200 cycles after going through the cell regeneration method according to an embodiment of the present invention.

FIG. 5 is a graph showing a capacity retention rate after further 200 cycles after going through the cell regeneration method according to another embodiment of the present invention.

FIG. 6 is a graph showing an increase in the capacity retention rate of a cell after going through the cell regeneration method according to a comparative example.

FIGS. 7 and 8 show states before/after the pressurizing of the pressurizing jig according to an embodiment of the present invention.

DETAILED DESCRIPTION OF THE PREFERRED EMBODIMENTS

Hereinafter, the present invention will be described in detail with reference to the drawings. The terms and words used in the present specification and claims should not be construed as limited to ordinary or dictionary terms and the inventor may properly define the concept of the terms in order to best describe its invention. The terms and words should be construed as meaning and concept consistent with the technical idea of the present invention.

Accordingly, the embodiments described in the specification and the configurations described in the drawings are only the most preferred embodiments of the present invention, and do not represent all of the technical ideas of the present invention. It is to be understood that there may be various equivalents and variations in place of them at the time of filing the present application.

FIG. 1 is a view schematically showing that gas is formed in an electrode assembly inside an end of life (EOL) cell, and FIG. 2 is a view schematically showing a state in which a gas has moved to the outside of the electrode assembly after going through the cell regeneration method according to an embodiment of the present invention.

Referring to FIGS. 1 and 2, according to a cell regeneration method according to the present invention, an end of life (EOL) cell is left alone under a high temperature environment of 80° C. or more while pressure is applied to the EOL cell including an electrode assembly 100 including a positive electrode 10, a negative electrode 20, and a separator interposed between the positive electrode 10 and the negative electrode 20, to thereby gas 40 inside the electrode assembly 100 to the external side of the electrode assembly 100. For example, after mounting the EOL cell to the pressuring jig, the cell can be regenerated by leaving the cell in a high temperature chamber set to a specific temperature for a predetermined time.

In this case, the end of life (EOL) cell may indicate a cell having a capacity retention rate of less than 80%. The EOL cell is a secondary battery, preferably a lithium secondary battery, used in a mobile phone, a portable computer, a wearable electronic device, a tablet PC, a smart pad, a netbook, a LEV (Light Electronic Vehicle), an electric vehicle, a hybrid electric vehicle, a plug-in hybrid electric vehicle, and a power storage device, etc., and the capacity retention rate may be less than 80%, preferably less than 75%. However, the present invention is not limited to this example, and when applied to a device or apparatus using such a battery, any battery showing the capacity retention rate that can no longer function as a power supply unit due to repeated cycles can correspond to the EOL cell of the present application.

The cell reaching the end of life (EOL) shows rapid capacity deterioration. Herein, the biggest factor is the increase in internal resistance due to gas generation inside the electrode assembly due to side reactions. According to the present invention, by leaving the EOL cell in a high temperature, high pressure environment for a certain time, the side reaction gas located inside the electrode assembly is moved to the outer portion of the electrode assembly, thereby reducing the internal resistance of the cell. This increases the capacity retention rate of the EOL cell.

Conventionally, the method of reusing an EOL cell has been a method of damaging certain parts of a cell and re-injecting the electrolyte by using expensive equipment in a well-controlled environment, but according to the present invention, the cell is not destroyed or damaged and cells can be regenerated in a simpler and more economical way.

Herein, the high temperature environment may be 80 to 100° C. If it is less than 80° C., it is not suitable because the binder component which exists in a separator part is not the suitable temperature which softens, and if it exceeds 100° C., there exists a possibility of electrolyte solution decomposition and shrinkage of a separator, which is not suitable.

The pressure applied to the EOL cell may be 2,133 psi to 3,555 psi. 2,133 psi is a common pressurizing condition when a battery cell is mounted on a module or pack, and it is appropriate to apply a pressurizing effect beyond this pressure. Exceeding 3,555 psi is not suitable because excessive pressure may be applied to the electrode assembly, causing damage.

Further, the time for leaving the EOL cell as it is may be 20 minutes to 24 hours. If the leaving time is less than 20 minutes, the pressurized high temperature storage effect is insignificant and not appropriate. If the stored time exceeds 24 hours, the amount of gas generated during pressurized high temperature storage may exceed the limit and may be vented outside the cell case.

For reference, when venting occurs outside the cell case, air or moisture outside the cell may penetrate into the cell, causing side reactions with the electrolyte, thereby degrading battery performance and generating degeneration of the electrode may. Hence, it is necessary to set the leaving time of the EOL cell so that venting does not occur outside the cell case.

In one embodiment of the present invention, the EOL cell may be pressurized by a pressurizing jig.

FIGS. 7 and 8 illustrate states before/after the pressurizing of the pressurizing jig according to an embodiment of the present invention. Referring to these figures, a pressurizing jig 200 that can be used in the cell regeneration method of the present invention includes:

a lower frame 210 configured to support the EOL cell;

a support 220 located on one side of the lower frame and having a flat upper surface having a larger area than the EOL cell;

a side frame 240 located on one side of the lower frame and having a hole through which a pressurizing bar 250 penetrates;

a pressurizing plate 230 which is connected to a pressurizing bar 250 and is installed to move between the support 220 and the side frame 240, and pressurizes a front surface of the EOL cell; and a pressurizing bar 250, which penetrates through the side frame 240, one end of which is located at an external side of the side frame 240, the other end of which is connected to the pressurizing plate, and which moves the pressurizing plate in a direction of the EOL cell to thereby pressurize the EOL cell, wherein the EOL cell is mounted between the pressurizing plate and the support and is pressurized.

Referring to FIGS. 7 and 8, the EOL cell 100 is accommodated in the space consisting of the support 220, the pressurizing plate 230 and the lower frame 210 constituting the pressurizing jig 200 of the present invention. In this case, the electrode tab of the EOL cell is facing upward, one side of the front surface of the EOL cell is in contact with the support 220, and the other side of the front surface of the EOL cell is in contact with the pressurizing plate 230.

After the EOL cell is mounted on the pressurizing jig 200 of the present invention, the pressurizing bar 250 is operated to move the pressurizing plate 230 connected to one end of the pressure bar 250 in the direction of the EOL cell, to thereby allow the pressurizing plate 230 to pressurize the front surface of the EOL cell. The pressurizing bar 250 may pass through the side plate 240 positioned on one side of the lower frame 10 to move the pressurizing plate.

The pressurizing bar 250 penetrating the side plate has a head portion protruding out of the side plate, extending from the head portion to the inside of the side plate. Since the rest of the body except for the head has a helical protrusion on the surface, when the pressurizing bar is rotated clockwise (counterclockwise), the pressurizing plate connected to the pressurizing bar moves in the direction of the EOL cell, and when the pressurizing bar is rotated counterclockwise (clockwise), the pressurizing plate moves in the direction of the side frame.

The side plate has a function of guiding the movement of the pressurizing bar, and the side plate includes a through hole penetrated by the pressurizing bar. The pressurizing bar is located in the through hole, and a groove corresponding to the spiral protrusion formed in the pressurizing bar is formed in the through hole, to thereby rotate the head of the pressurizing bar clockwise or counterclockwise, which allows the pressurizing bar to penetrate the side frame to advance or retract the pressurizing plate.

Since the pressurizing plate 230 and the support 220 become in contact with the front surface of the EOL cell, in order to effectively pressurize the EOL cell and prevent damage to the EOL cell, pressurizing pads may be attached to upper portions of the pressurizing plate 230 and the support 220, respectively. The pressurizing pad may be made of a thermoplastic polyurethane, a natural rubber, a synthetic rubber, a thermosetting resin, or the like, and is not limited thereto unless it is deformed at a high temperature of 80 to 100° C.

In one embodiment of the present invention, in order to regenerate the EOL cell, a high temperature environment is required. The EOL cell is accommodated in a chamber maintaining the temperature of 80 to 100° C., and the high temperature environment can be created by a sealable chamber.

The chamber for regeneration of the EOL cell may include a pressurizing jig for pressurizing the EOL cell inside the chamber, or a fixing unit for fixing the EOL cell, in which the EOL cell is mounted on the pressurizing jig and pressurized, and the pressurizing jig.

The chamber may further include a temperature sensing member configured to sense a temperature inside the chamber in order to maintain a constant temperature; and a display unit configured to display a temperature sensed by the temperature sensing member.

Meanwhile, the positive electrode, the negative electrode, the separator, and the nonaqueous electrolyte constituting the cell of the present application may be those used in general lithium secondary batteries.

The positive electrode may include a positive electrode current collector and a positive electrode active material layer coated on one or both surfaces thereof. Herein, non-limiting examples of positive electrode current collectors may include foils made of aluminum, nickel, or combinations thereof. The positive electrode active material included in the positive electrode active material layer may be any one selected from the group consisting of $LiCoO_2$, $LiNiO_2$, $LiMn_2O_4$, $LiCoPO_4$, $LiFePO_4$, $LiNiMnCoO_2$ and $LiNi_{1-x-y-z}Co_xM1_yM2_zO_2$ (M1 and M2 is any one selected from the group independently consisting of Al, Ni, Co, Fe, Mn, V, Cr, Ti, W, Ta, Mg and Mo, and x, y and z are atomic fractions of the elements of the oxide composition independently of one another, in which $0 \leq x < 0.5$, $0 \leq y < 0.5$, $0 \leq z < 0.5$, $x+y+z \leq 1$) or a mixture thereof.

Further, the positive electrode active material layer may further include a conductive material to improve electrical conductivity. In this case, the conductive material is not particularly limited as long as it is an electronic conductive material that does not cause chemical change in the lithium secondary battery. In general, carbon black, graphite, carbon fiber, carbon nanotubes, metal powder, conductive metal oxide, organic conductive materials, and the like can be used, and products currently available as conductive materials include acetylene black (Chevron Chemical Company or Gulf Oil Company), Ketjen Black EC series (Armak Company), Vulcan XC-72 (Cabot Company) and Super P (MMM company). For example, acetylene black, carbon black, graphite, etc. may be used.

In addition, for example, various kinds of binders such as polyvinylidene fluoride-hexafluorofluoropropylene (PVDF-co-HFP), polyvinylidene fluoride (PVDF), polyacrylonitrile, polymethyl methacrylate, styrene-butadiene rubber (SBR), and carboxyl methyl cellulose (CMC) may be used as binders having a function of maintaining the positive electrode active material in the positive electrode current collector and connecting the active materials.

On the other hand, the negative electrode is manufactured by applying the negative electrode active material on the negative electrode current collector and then drying and pressing the current collector, and optionally, the conductive material, binder, filler, etc. may be further included as necessary.

In this case, non-limiting examples of the negative electrode active material may include a conventional negative electrode active material that can be used for the negative electrode of the conventional electrochemical device, and in particular, lithium metal or lithium alloy, and lithium absorbing materials such as carbon, petroleum coke, activated carbon, graphite or other carbons are preferable.

The negative electrode current collector is generally made to a thickness of 3 to 500 micrometers. The negative electrode current collector is not particularly limited as long as it has electrical conductivity without causing chemical changes in the battery, and examples thereof include copper, stainless steel, aluminum, nickel, titanium, sintered carbon, copper or stainless steel of which the surface has been treated with carbon, nickel, titanium, silver or the like, aluminum-cadmium alloy, or the like. In addition, like the positive electrode current collector, fine unevenness can be formed on the surface to enhance the bonding force of the negative electrode active material, and it can be used in various forms such as a film, a sheet, a foil, a net, a porous body, a foam, and a nonwoven fabric.

Further, the separator may be made of a porous polymer substrate, and any porous polymer substrate commonly used in a lithium secondary battery may be used as the porous polymer substrate. For example, a polyolefin-based porous membrane or a nonwoven fabric may be used, but the present invention is not limited to these examples.

Examples of the polyolefin-based porous membrane include polyethylene such as high density polyethylene, linear low density polyethylene, low density polyethylene, ultra high molecular weight polyethylene, and a membrane in which polyolefin-based polymers, such as polypropylene, polybutylene, and polypentene, are each formed alone or in a mixture thereof.

The thickness of the porous polymer substrate is not particularly limited, but may be 1 μm to 100 μm, or 5 μm to 50 μm.

The pore size and the pore rate in the porous polymer substrate are also not particularly limited, but may be 0.001 μm to 50 μm and 10% to 95%, respectively.

Further, the electrolyte salt contained in the nonaqueous electrolyte that can be used in the present invention is a lithium salt. Those conventionally used in the electrolyte for lithium secondary batteries may be used as the lithium salt without limitation. For example, the negative ions of the lithium salt may be one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$.

As the organic solvent included in the nonaqueous electrolyte described above, those conventionally used in electrolytes for lithium secondary batteries may be used without limitation, and for example, ethers, esters, amides, linear carbonates, and cyclic carbonates may be used alone or in combination of two or more.

Meanwhile, the EOL cell according to the present invention may be preferably a pouch-type cell, but is not limited thereto.

In particular, the regeneration method according to the present invention can be applied to a pack or module unit to which an EOL cell is applied since it only needs to satisfy a specific pressure and high temperature environment.

Hereinafter, the present invention will be described in detail with reference to examples. However, the embodiments according to the present invention may be modified into various other forms, and the scope of the present invention should not be construed as being limited to the embodiments described below. The embodiments of the present invention are provided to more fully describe the present invention to those skilled in the art.

1. Preparation of Lithium Secondary Battery (1) Preparation of Positive Electrode 95 parts by weight of $LiNi_{1/3}Mn_{1/3}Co_{1/3}O_2$ as a positive electrode active material, 2.5 parts by weight of super P as a conductive material, and 2.5 parts by weight of polyvinylidene fluoride (PVDF) as a binder were added to NMP as a solvent to prepare a positive electrode active material slurry, and then the positive electrode active material slurry was applied on an aluminum current collector and was then dried to thereby prepare a positive electrode.

(2) Preparation of Negative Electrode 95 parts by weight of artificial graphite as a negative electrode active material, 1.5 parts by weight of super P as a conductive material and 3.5 parts by weight of PVDF as a binder were added to NMP as a solvent to prepare a negative electrode active material slurry, and then the negative electrode active material slurry was applied on a copper current collector and was then dried to thereby prepare a negative electrode.

(3) Preparation of Lithium Secondary Battery

An electrode assembly having a separator (polyethylene porous polymer substrate) interposed between the prepared positive electrode and negative electrode is inserted into a pouch-type battery case, and then the non-aqueous electrolyte solution (1M $LiPF_6$, VC 1% by weight, FEC:EMC=3:7 (volume ratio)) was injected and was then completely sealed to thereby prepare a lithium secondary battery.

2. Measurement of Battery Capacity Retention Rate (1) Example 1

1,000 cycles of charging and discharging were performed for the lithium secondary battery prepared above at 0.5 C rate and 2.5 V to 4.25 V constant current-constant voltage (CCCV) to thereby reach EOL. The capacity and the pulse resistance were measured at 0.5 C rate at the point of beginning of life (BOL) (0 cycle), at the point of EOL (1000-th cycle), and at 200-cycle intervals.

After reaching the EOL, the battery was placed in a pressurizing jig, and then stored in an 85° C. environment for 24 hours, and then again subjected to capacity check at 0.5 C rate.

The result graph is shown in FIG. 3.

Referring to FIG. 3, after pressurized and stored in a high temperature environment, it can be seen that the capacity retention rate is improved from about 70% to 80%.

Subsequently, the lithium secondary battery after pressurized high-temperature storage was charged/discharged by 200 cycles at 0.5 C rate and 2.5 V to 4.25 V constant current-constant voltage (CCCV), respectively, and then capacity is checked and the pulse resistance was measured at 0.5 C rate.

The result graph is shown in FIG. 4.

Referring to FIG. 4, after 200 cycles, the capacity retention rate was about 76%, and the pulse resistance also slightly decreased during the course of 200 cycles.

(2) Example 2

The capacity and the pulse resistance were measured at 0.5 C rate in the same manner as in Example 1, except that the battery having reached the EOL was mounted on the pressurizing jig and then stored in a 85° C. environment for 3 hours instead of 24 hours.

The result graph is shown in FIG. 5.

Referring to FIG. 5, after the pressurized high temperature storage for the battery reaching the EOL, it can be confirmed that the capacity retention rate is improved from about 70% to about 81%.

In addition, when the lithium secondary battery after pressurized high-temperature storage has gone through 200 cycles of charge/discharge, the capacity retention rate has fallen from about 81% to about 65%, and the pulse resistance has slightly increased.

The results show that the capacity retention rate decreases more slowly as the cycle progresses when left in a pressurized high temperature environment for a longer time.

(3) Comparative Example 1

The capacity and the pulse resistance were measured at 0.5 C rate in the same manner as in Example 1, except that the battery having reached the EOL was mounted on the pressurizing jig and then stored in a 75° C. environment.

The result graph is shown in FIG. 6.

Referring to FIG. 6, after the pressurized high-temperature storage for the battery reaching the EOL, it can be seen that the capacity retention rate increased by about 1.57%, from about 70% to about 71.1%.

The above description is merely illustrative of the technical idea of the present invention, and those skilled in the art to which the present invention pertains may make various modifications and variations without departing from the essential characteristics of the present invention. Therefore, the embodiments disclosed in the present invention are not intended to limit the technical idea of the present invention but to describe the present invention, and the scope of the technical idea of the present invention is not limited by these embodiments. The scope of protection of the present invention should be interpreted by the following claims, and all technical ideas within the scope equivalent thereto should be construed as being included in the scope of the present invention.

| [Description of Symbols] | |
| --- | --- |
| 10: positive electrode, | 20: negative electrode |
| 30: separator | 40: gas |
| 100: electrode assembly | 110: electrode tab |
| 200: pressurizing jig | |
| 210: lower frame | 220: support |
| 230: pressurizing plate | 240: side frame |
| 250: pressurizing bar | |

The invention claimed is:

1. A cell regeneration method for moving a gas located inside an electrode assembly of an end of life (EOL) cell to an external portion of the electrode assembly, the electrode assembly including a positive electrode, a negative electrode, and a separator interposed between the positive electrode and the negative electrode, the EOL cell having a capacity retention rate of less than 80%, the method comprising:

placing the EOL cell in a high temperature environment for a predetermined time such that venting of the gas does not occur outside a cell case of the EOL cell, the high temperature environment being at least 80° C.; and simultaneously applying pressure to the EOL cell while in the high temperature environment.

2. The cell regeneration method of claim 1, wherein the high temperature environment is at 80 to 100° C.

3. The cell regeneration method of claim 1, wherein the pressure applied to the EOL cell is a pressure of between 2,133 psi and 3,555 psi.

4. The cell regeneration method of claim 1, wherein the predetermined time is 20 minutes to 24 hours.

5. The cell regeneration method of claim 1, wherein the EOL cell is a pouch-type cell.

6. The cell regeneration method of claim 1, wherein pressure is applied to the EOL cell by a pressurizing jig.

7. The cell regeneration method of claim 6, wherein the pressurizing jig comprises:

a lower frame configured to support an end of the EOL cell;

a support located on a first side of the lower frame, the support having a flat surface configured to face a first surface of the EOL cell, the flat surface having a larger area than an area of the first surface of the EOL cell;

a side frame located on a second side of the lower frame opposite the first side, the side frame having a hole;

a pressurizing bar extending through the hole of the side frame;

a pressurizing plate directly connected to the pressurizing bar, the pressurizing plate being movable between the support and the side frame by movement of the pressurizing bar, and the pressurizing plate being configured to press a second surface of the EOL cell opposite the first surface of the EOL cell.

8. The cell regeneration method of claim 7, wherein the EOL cell is mounted on the pressurizing jig such that an electrode tab of the EOL cell extends away from lower frame and is higher than an upper surface of the support and the side frame.

9. The cell regeneration method of claim 7, wherein applying pressure to the EOL cell includes rotating the pressurizing bar to move the side frame towards the support.

10. The cell regeneration method of claim 1, wherein the high temperature environment is provided as a sealable chamber, and wherein the chamber includes a temperature sensor configured to sense a temperature inside the chamber; and a display for displaying the temperature sensed by the temperature sensor.

* * * * *